Sept. 23, 1969     T. A. HAMMOND ET AL     3,468,408
MULTI-SPEED CONVEYOR
Filed Sept. 11, 1967     2 Sheets-Sheet 1
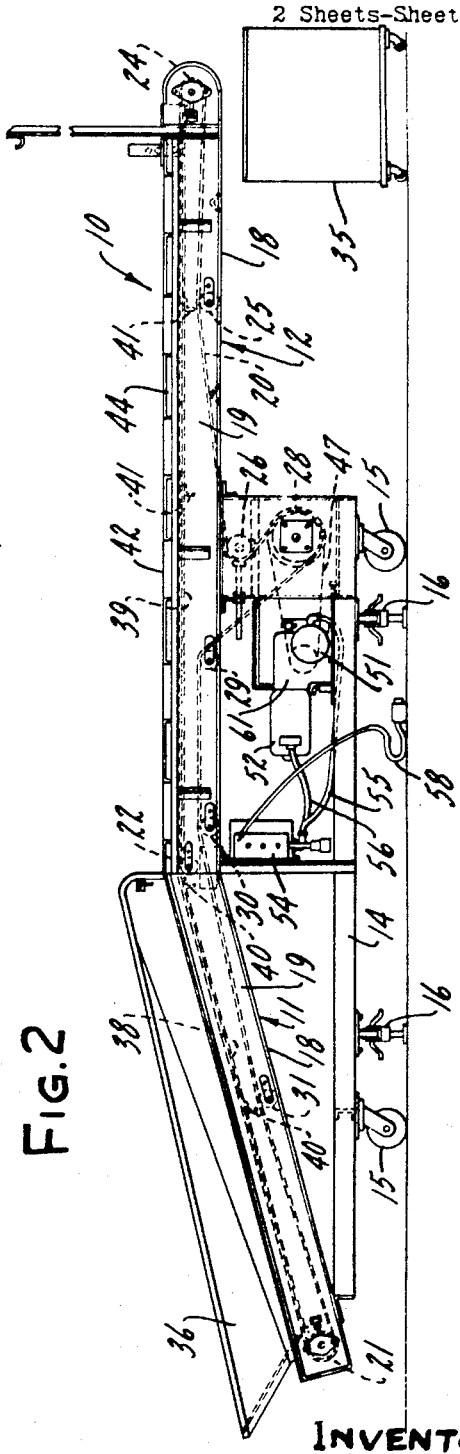
INVENTORS
THEODORE A. HAMMOND
JOHN D. SUMMERS
by: Wolfe, Hubbard, Voit & Osann
ATTYS.

Sept. 23, 1969  T. A. HAMMOND ET AL  3,468,408
MULTI-SPEED CONVEYOR
Filed Sept. 11, 1967  2 Sheets-Sheet 2
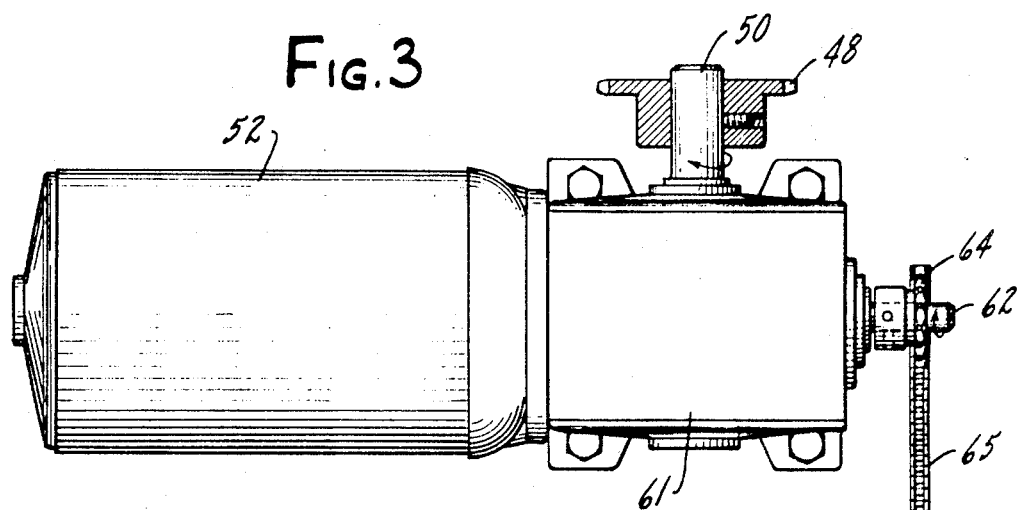
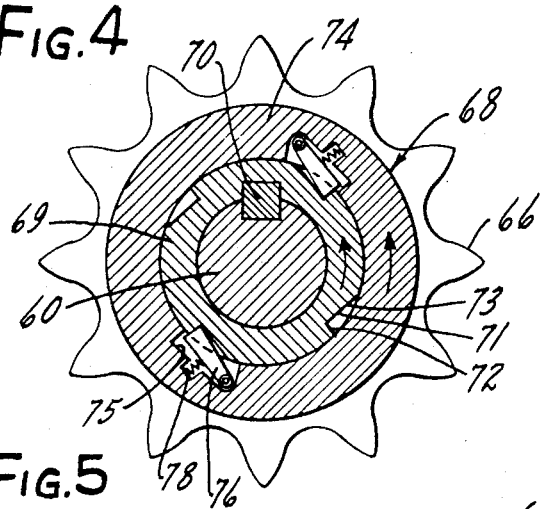
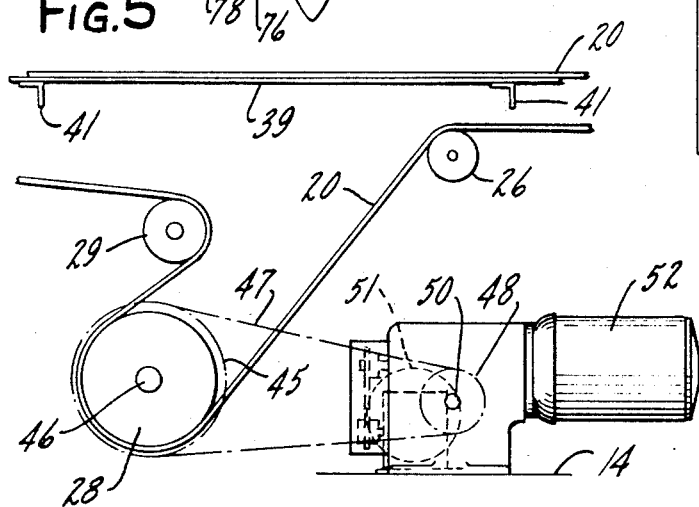
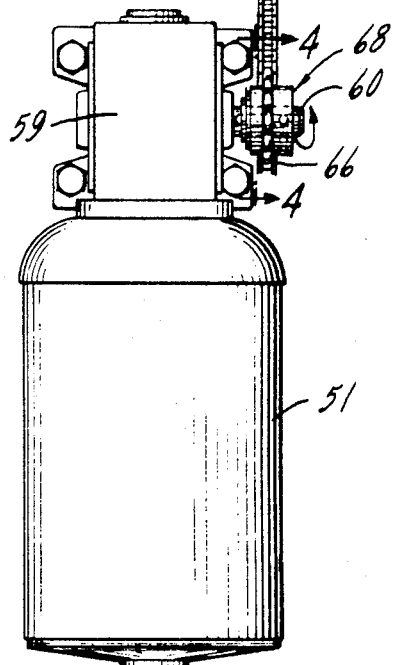
INVENTORS
THEODORE A. HAMMOND
JOHN D. SUMMERS
by: Wolfe, Hubbard, Voit & Osann
ATTYS.

United States Patent Office 3,468,408
Patented Sept. 23, 1969

3,468,408
MULTI-SPEED CONVEYOR
Theodore A. Hammond and John D. Summers, Grand Haven, Mich., assignors to Ermanco Incorporated, Grand Haven, Mich., a corporation of Michigan
Filed Sept. 11, 1967, Ser. No. 666,728
Int. Cl. B65g 23/30; F16h 37/08
U.S. Cl. 198—110                        5 Claims

ABSTRACT OF THE DISCLOSURE

A sorting speed conveyor having a multiple motor drive including a low speed motor which drives the conveyor at a predetermined slow speed through two successive gear boxes and a high speed motor which drives the conveyor at a predetermined higher speed through only the second gear box. An over-running clutch connection is interposed between the two gear boxes in order to permit the high speed motor to be energized intermittently to drive the conveyor at high speeds without de-energizing or disengaging the low speed motor from the drive system.

---

The present invention relates to conveyor systems and more particularly to a conveyor having a multiple motor drive for driving the conveyor at either of two predetermined speeds.

It is an object of the invention to provide an improved conveyor especially adapted for Post Office use and the sorting of mail. More particularly, it is an object to provide such a conveyor having a drive adapted to move a conveying surface at a predetermined slow speed to facilitate the selection of desired pieces of mail from the surface, and after such selection the drive is adapted to move the conveying surface at a predetermined higher speed to rapidly clear the remaining pieces of mail from the conveyor.

Another object is to provide a sorting conveyor as characterized above in which the drive comprises a high speed motor and a low speed motor interconnectedly mounted so that they may be operated simultaneously or singularly to produce varying speeds of the conveyor.

Still another object is to provide a sorting conveyor drive of the above kind in which the high speed and low speed motors are interconnected through an over-running clutch so that the high speed motor may be energized to drive the conveyor at a high speed without the necessity of de-energizing or disengaging the low speed motor from the system.

Other objects and advantages will become apparent as the foregoing description proceeds, taken in conjunction with the accompanying drawings, in which.

FIG. 1 is a top view of the sorting conveyor shown in FIG. 1 with a portion of the conveyor belt and housing removed to show the drive;

FIG. 2 is a side elevation view of an illustrative sorting conveyor embodying the present invention;

FIG. 3 is an enlarged plan view of the conveyor drive;

FIG. 4 is an enlarged fragmentary section taken in the plane of line 4—4 in FIG. 3; and FIG. 5 is an enlarged side elevation of the conveyor drive as seen from line 5—5 in FIG. 2.

While the invention is susceptible of various modifications and alternative constructions, certain illustrative embodiments thereof have been shown in the drawings and will be described in detail. It should be understood, however, that there is no intention to limit the invention to the specific forms disclosed, but, on the contrary, the intention is to cover all modifications, alternative constructions and equivalents falling within the spirit and scope of the invention.

Referring more specifically to FIGS. 1 and 2, the invention is there exemplified in an illustrative sorting conveyor 10. The illustrated conveyor 10 includes an inclined entrance ramp 11 and a horizontal sorting bed 12 both mounted on a structural frame 14. The frame 14 is supported as by means of casters 15 so that the conveyor may be conveniently moved about. To provide additional support for the conveyor after its location is determined and to prevent subsequent movement of the conveyor during operation, adjustable legs 16 may be cranked into load supporting position.

The inclined ramp 11 and sorting bed 12 each are formed as open top troughs having a bottom panel 18 and side panels 19. Disposed within the ramp and bed troughs is a movable support which in the present instance happens to be a continuous conveyor belt 20. The belt 20 is trained about a series of rollers which are rotatably held between the side walls of the ramp 11, bed 12 and frame 14 so that the belt forms a conveying surface along the upper portions of the troughs. As shown in FIGS. 1 and 2, the belt revolves about a roller 21 at the front end of the ramp, a roller 22 located where the ramp joins the bed, a roller 24 at the discharge end of the bed, tension rollers 25 and 26, a drive roller 28, and rollers 29, 30 and 31.

By driving the conveyor belt 20, mail or other articles 32 placed or dropped on the inclined ramp 11 may be transferred up the ramp 11, along the sorting bed 12, and off the discharge end of the conveyor into an appropriate container 35. To insure that the mail dumped on the entrance ramp is directed onto the conveyor belt 20, flaring panels 36 surround the lower end of the ramp. In order to provide additional support for the upper load supporting portion of the belt 20 so that it does not sag excessively due to the weight of the articles being conveyed, plates 38, 39, are disposed immediately beneath the upper portions of the belt. As best shown in FIGS. 2 and 5, one plate 38 is mounted on angles 40 within the inclined ramp 11 and extends substantially between the rollers 21 and 22. A second plate 39 similarly is mounted with the bed on angles 41 and extends between rollers 22 and 24.

As mail passes along the sorting bed, workers positioned on each side of the bed may pick out particular pieces of mail and let the remained be conveyed over the discharge end of the bed into the container 35. Along each side of the bed is a long outwardly panel 42 when serves as a working surface for mail sorters. The panels 42 are formed with a series of spaced slots 44 through which sorted mail may be deposited. It is apparent that individual mail containers may be disposed below each slot to receive the sorted mail.

Referring to FIG. 5, to facilitate driving the conveyor belt 20, a sprocket 45 is mounted on a shaft 46 which also carries the drive roller 28. The sprocket 45 is connected by a chain 47 to a sprocket 48 mounted on an output shaft 50 of the conveyor drive. Thus, by driving the output shaft 50, the belt 20 is driven through the sprocket 48, chain 47, sprocket 45, shaft 46 and drive pulley 28.

In accordance with the invention, the conveyor drive comprises a pair of motors interconnectably mounted so that one motor may drive the conveyor at a predetermined slow speed to facilitate the easy selection of mail from the moving conveyor surface, while the second motor may be selectively energized for high speed operation of the conveyor, without de-energizing the first motor, so that pieces of mail remaining on the conveyor can be rapidly cleared off the discharge end. Referring to FIGS. 1–3, a low speed electric motor 51 and a high speed electric motor 52 are mounted on the structural frame 14 below the conveyor bed 12. The motors 51 and 52 are connected to a control box 54 through electric conduits 55 and 56, respectively. The control box 54 is connected through a conduit 58 to an electrical outlet in the floor below the conveyor.

The low speed motor 51 in this case is provided with a conventional gear reducer 59 having an output shaft 60. The high speed motor 52 is provided with a conventional gear reducer 61 having an output shaft 50 and input shaft 62. The shaft 50 serves as the main output drive shaft for the conveyor, and the input shaft 62 is geared to the shaft 50 and has one end driven by the high speed motor 52 and the other end extending out of the gear box carrying a sprocket 64. The input shaft 62 is connected to the shaft 60 of the low speed gear reducer through the sprocket 64, a chain 65 and sprocket 66. By this arrangement, the conveyor drive shaft 50 may be driven either directly by the high speed motor 52, or by the low speed motor 51 through the shaft 60, chain 65, and shaft 62.

In carrying out the invention, an overrunning clutch connection is interposed between the two gear reducers 59 and 61 in order to permit the high speed motor 52 to be energized intermittently to drive the main conveyor drive shaft 50 at high speeds without de-energizing or disengaging the low speed motor 51. As shown in FIGS. 3 and 4, an overrunning clutch 68 connects the sprocket 66 to the shaft 60 of the low speed gear reducer 59. The illustrated clutch includes a ring 69 secured to the shaft 60 by a key 70. The ring 69 is formed with a plurality of outer peripheral V-shaped notches 71, each having a short side 72 extending radially inward and a longer side 73 extending nearly tangentially. The sprocket 66 is mounted on a hub 74 formed with a pair of internal cavities 75 each having a spring actuated dog 76 rotatably secured to the hub by a pin and biased radially inward by a spring 78.

It can be seen that when the high speed motor 52 is de-energized and the low speed motor 51 is driving the shaft 60 in the counterclockwise direction as shown in FIG. 4, the outwardly biased dogs 76 engage the radial edges 72 of two diametrically opposed notches 71 to drive the hub 74 and sprocket 66 in the counterclockwise direction. As described above, the sprocket 66 in turn drives the chain 65, sprocket 64, secondary output shaft 62, and conveyor drive shaft 50, thus driving the conveyor belt at the slow speed.

To drive the conveyor belt at a higher speed, the high speed motor 52 may be selectively energized. Upon energization of the high speed motor, the speeds of both the input shaft 62 and main drive shaft 50 are increased. Since the chain 65 is then driven by the sprocket 64 of the input shaft 62 at a faster speed than the low speed output shaft 60 is turning, the sprocket 66 tends to overrun the shaft 60 and ring 69. As the sprocket 66 is pulled ahead of the shaft 60 by the chain 65, the tangential notch surfaces 73 tend to cam the dogs 76 into their sprocket cavities 75 against the force of the spring 78 so that the sprocket may rotate over the ring. Since each notch is similarly formed, the dogs can pass the other notches in the same way. Thus, when the high speed motor 52 is driving the conveyor belt, the low speed motor 51 is permitted to run simultaneously with the overrunning clutch 68 preventing the backward transfer of power from the high speed gear reducer 61 to the low speed gear reducer 59 and motor 51. When the high speed operation of the conveyor is completed, the high speed motor may be de-energized and the low speed motor which has continued to run will cause the clutch dogs to quickly engage the ring notches so that the low speed motor will again power the conveyor drive shaft drive.

It should be appreciated that the overrunning clutch connection alternately could be disposed between the input shaft 62 of the high speed motor and the sprocket 64. Such an arrangement similarly would permit simultaneous operation of the high speed and low speed motors without the backward transfer of power from the large motor to the small one. It is also apparent that the resulting speed of the conveyor belt is determined not only by the speed of the motors but from the ratios of the gear reducers and sprockets employed in the drive system. Alternatively, other conventional drive members such as sheaves and belts could be used to connect the motors and drive the conveyor belt.

Moreover, although the conveyor of the present invention has been illustrated for use in sorting mail, it may be used for many other multi-speed conveyor applications. The conveyor of the present invention, however, is particularly useful where sudden bursts of speed are required since an independent large motor may be used which is capable of providing fast acceleration of the movable support.

We claim as our invention:

1. A multiple speed conveyor comprising, in combination, a frame, a movable support carried by said frame for transporting articles along said conveyor, a first electric motor having an attached gear reducer, means operatively connecting said first motor to said movable support through said gear reducer, a second electric motor having attached a second gear reducer, means operatively connecting said second motor to said movable support through both said second and first gear reducers, control means for energizing said second motor to drive said movable support at a predetermined slow speed, said control means being adapted to selectively energize said first motor to drive said movable support at a predetermined higher speed, and an overriding clutch connection interposed between said gear reducers to permit said first motor to be energized intermittently to drive the movable support at said high speed without de-energizing said second motor.

2. The multiple speed conveyor of claim 1 in which the first gear reducer has an input shaft and a main output drive shaft geared to said input shaft, said second gear reducer having an output shaft operatively connected to said input shaft so that when only said second motor is energized said movable support is driven through said second gear reducer output shaft, said input shaft and said main drive shaft, and said overrunning clutch is interposed between said second gear reducer output shaft and said input shaft so that when said first motor is energized said clutch prevents a backward transfer of power from said first motor to said second gear reducer and motor.

3. The multiple speed conveyor of claim 2 in which said second gear reducer output shaft and said input shaft each carry a sprocket and a chain connects said sprockets, and said overrunning clutch is interposed between one of said sprockets and the gear reducer shaft carrying said sprocket.

4. The multiple speed conveyor of claim 2 in which said movable support is a continuous belt disposed about a plurality of rollers to define a flat conveying surface, and said main drive shaft is connected to one of said rollers so that energization of either of said motors drives said drive shaft, roller and belt.

5. The multiple speed conveyor of claim 3 in which said sprocket which includes the overriding clutch is formed with a plurality of internal cavities, said clutch including a spring biased dog member rotatably secured in each of said internal sprocket cavities, said dog members being biased radially inward toward the shaft carrying said sprocket and clutch, said clutch and sprocket shaft having an outer surface formed with a plurality of V-shaped notches each having a generally tangential cam surface and a radial surface, said dog members each being biased into engagement with one of said V-shaped notches to drivingly connect said sprocket to said shaft to cause said second motor to drive said movable support at a predetermined slow speed when said first motor is de-energized, and said dog members being repeatedly cammed out of engagement with said V-shaped notches by the tangential sides of said notches in an overriding manner when said first motor is energized to drive said movable support at a predetermined higher speed.

References Cited

UNITED STATES PATENTS

| 1,951,875 | 3/1934 | Laabs | 74—661 |
| 2,249,109 | 7/1941 | Botimer | 209—125 |
| 3,127,790 | 4/1964 | Howey | 74—661 |

RICHARD E. AEGERTER, Primary Examiner

U.S. Cl. X.R.

94—661